United States Patent [19]
Farris et al.

[11] Patent Number: 5,751,789
[45] Date of Patent: May 12, 1998

[54] SNID WITH WIRELESS BACKUP

[75] Inventors: Robert D. Farris, Sterling; Richard G. Backus, Manassas, both of Va.

[73] Assignee: Bell Atlantic Network Services, Inc., Arlington, Va.

[21] Appl. No.: 557,396

[22] Filed: Nov. 13, 1995

[51] Int. Cl.⁶ .......................... H04M 1/24; H04M 3/08; H04M 3/22

[52] U.S. Cl. .................. 379/34; 379/1; 379/33; 379/2; 455/404; 455/426; 455/445; 455/554; 455/557

[58] Field of Search .................... 379/1-2, 15, 33, 379/34, 58-59, 39-40; 455/404, 426, 445, 554, 557

[56] References Cited

U.S. PATENT DOCUMENTS

| | | |
|---|---|---|
| 4,456,793 | 6/1984 | Baker et al. . |
| 4,542,262 | 9/1985 | Ruff . |
| 4,628,152 | 12/1986 | Akerberg . |
| 4,658,096 | 4/1987 | West, Jr. et al. . |
| 4,682,351 | 7/1987 | Makino . |
| 4,731,812 | 3/1988 | Akerberg . |
| 4,754,473 | 6/1988 | Edwards . |
| 4,776,000 | 10/1988 | Parienti . |
| 4,825,457 | 4/1989 | Lebowitz . |
| 4,868,859 | 9/1989 | Sheffer . |
| 4,878,238 | 10/1989 | Rash et al. . |
| 4,887,290 | 12/1989 | Dop et al. ........................ 379/33 |
| 4,993,059 | 2/1991 | Smith et al. . |
| 5,012,511 | 4/1991 | Hanle et al. . |
| 5,020,094 | 5/1991 | Rash et al. . |
| 5,027,383 | 6/1991 | Sheffer . |
| 5,068,890 | 11/1991 | Nilssen . |
| 5,138,651 | 8/1992 | Sudo . |
| 5,146,486 | 9/1992 | Lebowitz . |
| 5,185,779 | 2/1993 | Dop et al. . |
| 5,210,788 | 5/1993 | Nilssen . |
| 5,235,638 | 8/1993 | Dondero . |
| 5,241,410 | 8/1993 | Streck et al. . |
| 5,247,701 | 9/1993 | Comroe et al. . |
| 5,255,308 | 10/1993 | Hashimoto et al. . |
| 5,259,017 | 11/1993 | Langmantel . |
| 5,327,478 | 7/1994 | Lebowitz . |
| 5,353,311 | 10/1994 | Emery et al. . |
| 5,572,193 | 11/1996 | Flanders et al. ............. 340/825.34 |

*Primary Examiner*—Curtis Kuntz
*Assistant Examiner*—Duc Nguyen
*Attorney, Agent, or Firm*—Lowe, Price, LeBlanc & Becker

[57] ABSTRACT

A smart network interface device (SNID), connects between the drop cable of a telephone line and customer premises wiring. To provide backup for the telephone line service, the SNID includes a wireless-to-landline interface. In response to detection of a fault in the telephone line, a controller activates a switch in the SNID. The switch changes the connection of the customer premises wiring over from the telephone line to the wireless-to-landline interface. When service switches to wireless communication, the wireless-to-landline interface registers with the public wireless telephone network. That wireless network assigns a temporary directory number to the interface and instructs the public switched landline telephone network to forward all subsequent calls for the customer through the wireless network using the temporary directory. All subsequent incoming and outgoing calls to and from the customer premises telephone utilize wireless communication. To the customer, however, the service essentially is indistinguishable from service provided via the telephone line.

21 Claims, 2 Drawing Sheets

SNID WITH WIRELESS BACKUP

TECHNICAL FIELD

The present invention relates to a smart network interface device (SNID) for coupling customer premises wiring to the subscriber's loop or drop cable of a telephone network, wherein the SNID includes a wireless telephone transceiver to provide backup service via a wireless telephone network. The present invention also contemplates interactions with the telephone network and the wireless network to provide a seemless transition between the primary telephone service and the backup wireless telephone service.

BACKGROUND ART

Telephone communication has become a virtually ubiquitous aspect of modern life, particularly in developed countries such as the United States. In such countries, subscribers have come to depend on the telephone network to provide fast, dependable communication whenever needed.

Particularly in residential settings, the customer premises wiring connects telephone station equipment to a central office switching system via a hardwired line. The line to the customer premises may take many different forms in the field, but most telephone circuit installations still utilize a twisted wire pair type loop or drop for at least the last 500 feet into the customer premises. The drop cable may run along telephone poles and from an aerial terminal to a network interface device on the customer premises. Alternatively, the drop cable may run underground from a pedestal to the network interface device. The network interface device in turn connects the drop cable to the customer premises wiring. The customer premises equipment (CPE), e.g. telephone stations and the like, connects to the customer premises wiring.

Installations of the type described above generally are extremely dependable. However, even such installations are subject to occasional failures. For example, a loop or drop cable run from telephone poles as an aerial installation may deteriorate over time due to exposure to atmospheric conditions. As another example, persons unaware of the route of an underground drop cable who are digging up the property for some reason may inadvertently cut the buried cable.

Repair of damaged outside plant, particularly drop cables, is labor intensive and expensive. If a local telephone company has only limited repair or installation technicians available, there will be times when the demand for their labor will result in work backlogs. At such times, it may take a week or more to repair a damaged drop cable. There are also times when a segment of the local telephone network, for example a central office and all network elements operating out of that office, fail for some reason. Most telephone subscribers, who have come to expect ever-present ubiquitous telephone service, quickly become irate if the telephone company does not restore the interrupted telephone services quickly. Also, loss of telephone service prevents persons from reporting emergencies.

Furthermore, certain landline telephone service subscribers have special needs requiring guaranteed uninterrupted service. For example, many elderly and infirm persons rely on such guaranteed telephone service to permit them to report injuries or illness to people who can provide emergency assistance. With such a special guaranteed service, a telephone company will guarantee to repair any line faults within a specified short period of time and to supply the customer with alternate telephone service (e.g. a cellular telephone) until the repair is completed. With such a service, however, the customer is aware of the fault. Also, in many cases, the customer must find some way to report the fault even though that customer's telephone service is inoperative. The subscriber is without service until the telephone company can deliver the alternate telephone. The telephone company must dispatch repair people quickly and must arrange delivery of the alternate telephone.

U.S. Pat. Nos. 4,887,290 and 5,185,779 to Dop et al. disclose an alarm system with a digital communicator that normally reports alarms via a dial-up connection over the subscriber's telephone line. The system includes a line fault detector, a cellular interface and a cellular transceiver. In the event of a line fault, a relay switches the tip and ring connections for the digital communicator as well as the house telephones to the cellular interface. The digital communicator then reports alarms via a cellular telephone call through interface and transceiver. The relay latches the customer premises connections to the interface so that all communications go through the cellular link until there is a manual reset. Apparently, in this condition persons in the house can make telephone calls from telephones through the interface and the cellular transceiver. The Dop et al. system is principally designed for reporting alarm conditions. As such, the system does not provide a seemless back-up for normal telephone communications to and from the customer premises equipment. For example, with the Dop et al. system, an inoperative telephone line would prevent reception of incoming telephone calls directed to the customer's normal landline telephone number.

From the above discussion it becomes apparent that a need exists to provide an effective efficient back-up to normal wireline based telephone communication services and that such service should provide full incoming and outgoing telephone services in a manner that fully emulates normal telephone operations.

DISCLOSURE OF THE INVENTION

The present invention addresses the above stated needs by providing an automatic wireless backup communication service. The wireless back-up service relies on an improved network interface device, referred to as a smart network interface device (SNID), which incorporates a line fault detector and a wireless-to-landline interface. Activation of the wireless-to-landline interface also initiates automatic processes within the landline telephone network and/or the wireless telephone network to establish the alternate service in such a manner that the changeover in service to the backup appears transparent to a user at the customer premises. For example, all calls to the subscriber's normal landline telephone number are automatically forwarded to the customer premises via the wireless telephone link and the wireless-to-landline interface.

In accord with the present invention, the SNID includes a switch for selectively connecting customer premises wiring to the wireless-to-landline interface. In normal operation, the switch connects the landline telephone loop to the customer premises wiring. If a fault is detected, the detector triggers a controller within the SNID. The controller activates the switch to connect the customer premises wiring to the wireless-to-landline interface.

The wireless-to-landline interface provides two-way wireless telephone type communication. In the preferred embodiment, the wireless-to-landline interface comprises a wireless telephone transceiver and a landline interface. The landline interface includes circuitry to provide dial-tone, off-hook detection, dialed digit collection and processing, ringing signal generation, etc. To the telephone equipment at the customer premises, the wireless-to-landline interface emulates a POTS type telephone loop. The landline interface provides all signal and/or protocol conversions necessary to provide two way signaling and voice communication between the customer premises telephone equipment and the wireless link through the wireless transceiver.

When the detector notifies the controller of the fault and the controller activates the switch to connect the customer premises wiring to the wireless-to-landline interface, the controller also issues a wake-up command to the wireless-to-landline interface. In response, the interface goes from a stand-by condition to an active condition and performs all processing (including any necessary wireless network signaling) to initialize the wireless communication capability. Once activated, the customer can make and receive outgoing calls in the normal manner. Often, the customer will not notice any change in service.

In a preferred embodiment, the wireless-to-landline interface provides cellular telephone type service. In response to the wake-up instruction, a cellular transceiver in the wireless-to-landline interface executes a registration procedure with the serving cellular carrier system, typically with the local serving mobile telephone switching office (MTSO). As part of that registration, the cellular system MTSO assigns a temporary directory number to the cellular transceiver and forwards a command to the appropriate network element to initiate forwarding of calls for the customer's normal POTS number to the temporary directory number.

In the preferred method of operation, the MTSO supplies a signal to the central office switching system indicating the registration. The signal identifies the customer premises, e.g. via the normal landline telephone number. The signal from the MTSO also includes the assigned temporary directory number in the signal sent to the central office switching system. In response to the signal from the MTSO, the central office switching system activates call forwarding with respect to the customer's line. Subsequently, the central office switching system forwards all telephone calls for the customer's landline telephone number to the MTSO, using the assigned temporary directory number. The MTSO in turn routes all such calls via cellular communication and the transceiver in the SNID to the customer premises wiring and the connected customer premises telephone equipment. To the customer, such calls appear as normal incoming telephone calls.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
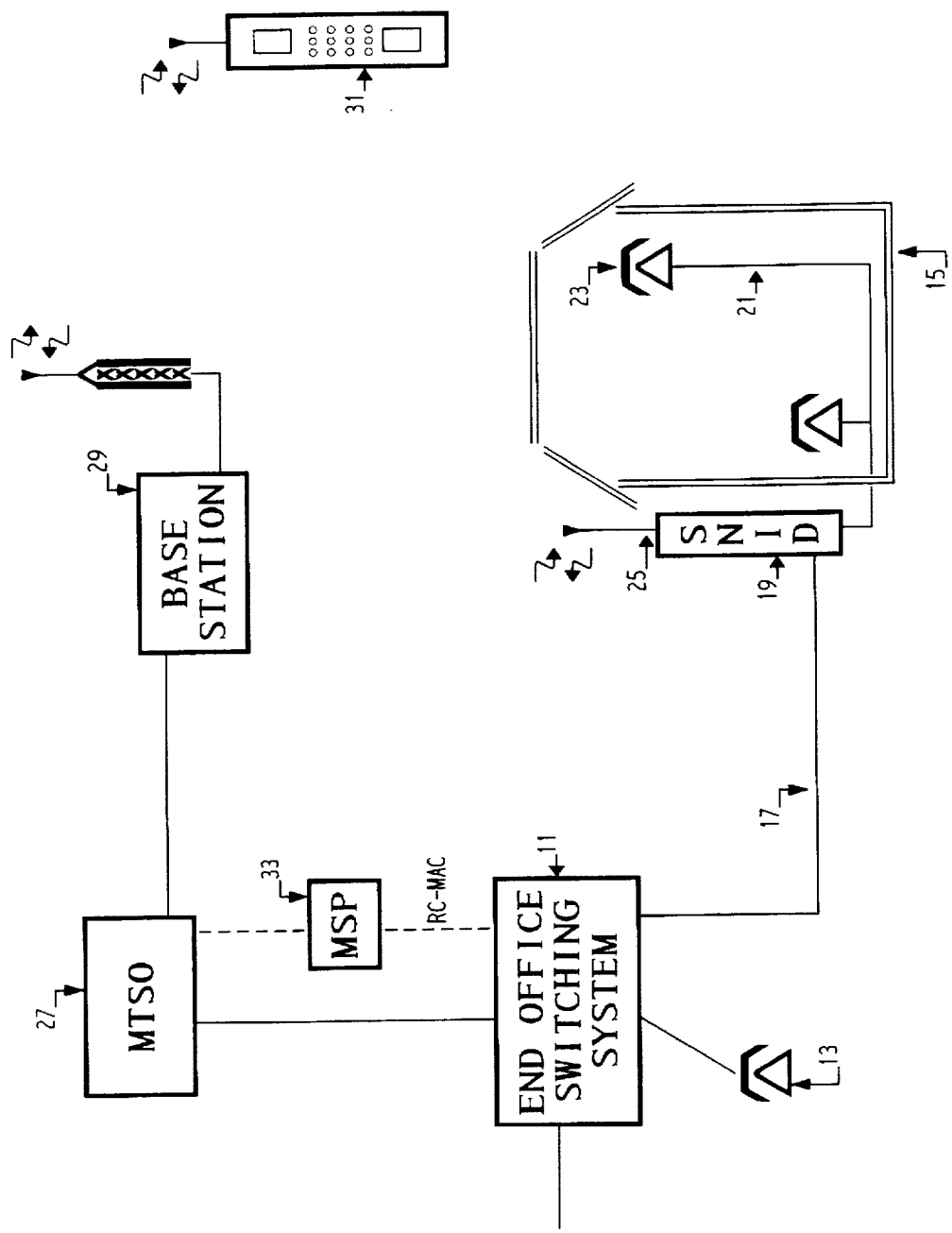
FIG. 1 is a simplified block diagram of a telephone company network, a cellular telephone network and a customer premises installation implementing the concepts of the present invention.

FIG. 1 provides a simplified representation of a communication system in accord with the present invention. An end office switch 11, of the local telephone network connects through telephone line loop circuitry to subscriber premises. By way of an example, the end office switch 11 may be a 1AESS or 5ESS switching system sold by American Telephone and Telegraph. Although not shown, the loop circuitry may include a variety of technologies, such as subscriber line carrier (SLC) systems, to combine traffic for a number of lines for longer runs between the subscriber premises and the end office switch 11. However, generally the final drop to the customer premises comprises a twisted wire pair. The end office switch 11 connects to a number of telephone stations 13 in the normal manner.

FIG. 1 also shows a customer premises 15 having the primary and backup services contemplated by the present invention. A wired telephone line 17, typically including a twisted wire drop to the subscriber premises 15, connects from the end office switch 11 to a smart network interface device (SNID) 19. The SNID 19 is mounted on the outside of the house at the subscriber premises and provides a normal connection from the drop cable of loop 17 to twisted wire pair type subscriber premises wiring 21. The subscriber premises wiring 21 in turn connects to customer premises equipment, shown as telephone stations 23. The SNID is the demarcation point between the public network elements and the subscriber premises wiring.

In accord with the present invention, the SNID 19 includes interface and transceiver circuitry (as discussed later) to provide wireless telephone communication, as a backup to the normal landline telephone communications. FIG. 1 shows an antenna 25 connected to the SNID 19 for sending and receiving telephone communication signals via appropriate channels of the wireless telephone network.

Any wireless telephone network may be used to carry the backup service communications. In the presently preferred embodiment, the wireless telephone network is a cellular telephone network. FIG. 1 therefore shows a mobile telephone switching office (MTSO) 27 and one of the base station transceivers 29, of the cellular network servicing the area around the subscriber premises 15.

The MTSO 27 connects to one or more of the switching offices of the local landline telephone network, such as the end office 11, via appropriate line or trunk circuits. A number of telephone lines connect the MTSO to each base station 29. The base station 29 provides two-way signal conversion between the signal formats on the wireless channels carrying the telephone communications within the particular cell and the signal formats on the lines to the MTSO 27. The MTSO 27 also conducts wireless signaling with cellular telephones through the base station 29, to set-up and tear down cellular telephone call sessions, to register roaming subscribers' cellular stations, etc.

The MTSO 27 and the base station 29 provide cellular telephone service to mobile and portable cellular telephone units, schematically represented by cellular handset 31, in the normal manner. In accord with the present invention, when landline service to the subscriber premises 15 is interrupted, the SNID 19 will register with the MTSO 27 as a roaming cellular station, and the MTSO 27 and the base station 29 will provide cellular telephone service through the SNID 19 to the customer premises telephone equipment 23.

The central processing unit of the MTSO 27 also connects to a multi-services platform (MSP) 33 via an appropriate data link. For example, the data link might provide a 9600 baud data channel over a line to the MSP platform 33. The MSP 33 provides an interface to the end office switch 11 permitting external programming of certain functions of the switch 11. In accord with the present invention, the MTSO 27 will activate a call forwarding feature when the SNID 19 registers as active with the MTSO 27.

The MSP 33 connects to the end office switching system 11 via a recent change-memory administration channel (RC-MAC). RC-MAC is a data link to the processor of the switching system 11 for inputting data into the translation tables used by the end office switching system 11 to control switched communications operations with regard to each subscriber's line. The MSP 33 is a processor for receiving various service change instructions, including those from the CPU of the MTSO 27 and from other sources. The MSP 33 processes the instructions as necessary to make them compatible with switch programming and forwards the processed instructions to the switching system 11 to change specific relevant translation table data stored in the memory of the switching system.

Operation via an RC-MAC channel to change data in a switching system relating to call forwarding is described in U.S. Pat. No. 5,012,511 to Hanle et al., the disclosure of which is incorporated herein in its entirety by reference. The MSP 33 is the same as or substantially similar to a processor used in the patented system to process various translation memory change requests, both from RC-MAC terminals and a voice response unit.

The MTSO 27 has a number of directory numbers reserved for use by roaming subscribers. These numbers are referred to as 'temporary directory numbers'. The MTSO assigns one temporary directory number to each roaming subscriber's cellular telephone, as part of the registration procedure when the roamer's telephone enters the area serviced by the MTSO 27. The cellular transceiver in the SNID 19 has a unit identification, and the MTSO 27 recognizes the SNID transceiver as a valid unit having service through the MTSO 27. However, the cellular system does not assign a normal cellular telephone number to the SNID 19, for regular full time cellular service. Instead, the MTSO 27 treats the SNID 19 as a roaming subscriber. The MTSO 27 therefore assigns one of the temporary directory numbers to the SNID 19 when the cellular transceiver in the SNID 19 becomes active after interruption of landline telephone service through loop 17.

When the MTSO 27 assigns a temporary directory number to the SNID 19, the CPU of the MTSO 27 supplies a data message to the MSP 33 identifying the SNID 19 (e.g. by landline telephone number or by the transceiver identification). The message includes the assigned temporary directory number. The MSP identifies the loop 17 from the identification of the SNID and compiles a call forwarding instruction in appropriate format for loading into the profile data associated with the loop 17 in the memory of the end office switching system 11. The MSP 33 forwards that instruction over an RC-MAC channel to the processor of the end office switch 11. In response, the processor of the switching system 11 activates call forwarding with respect to the loop 17 and loads the temporary directory number into the appropriate memory location.

Subsequently, the end office switch 11 forwards calls for the telephone number assigned to loop 17 using the assigned temporary directory number. The switch 11 routes each such call to the MTSO 27, in such a manner that the MTSO can identify the temporary directory number. In response to the call now directed to the assigned temporary directory number, MTSO 27 and base station 29 provide cellular routing of the call to the SNID 19 and the customer premises equipment 23.

Figure 2:
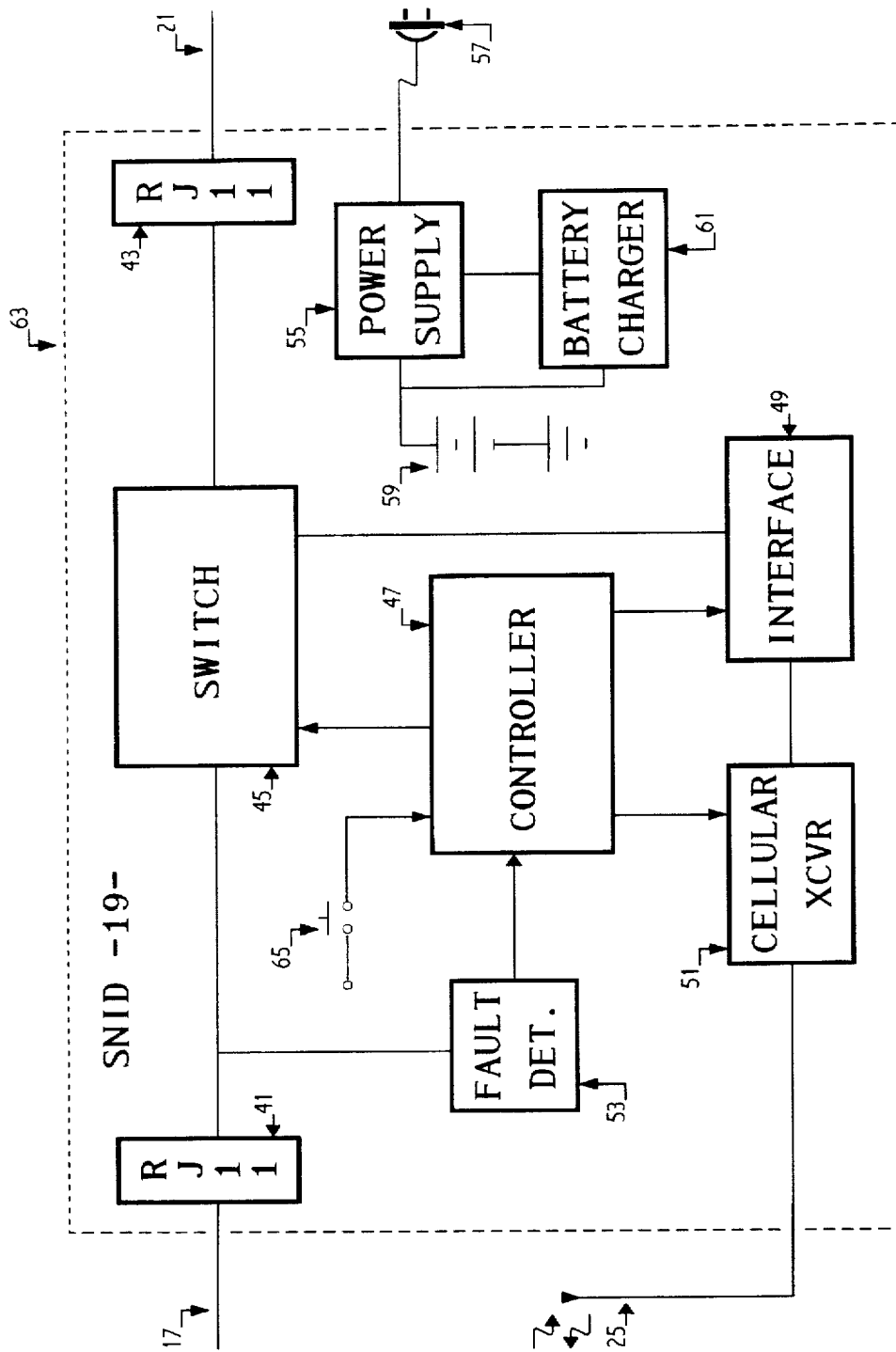
FIG. 2 is a functional block diagram of a smart network interface device (SNID) for use in the customer premises installation illustrated in FIG. 1.

FIG. 2 illustrates the structure of a SNID 19, of the type used in the present invention. The SNID 19 includes two RJ11 jacks 41, 43. The end of the drop cable of telephone line 17 terminates in an RJ11 plug (not separately shown). Insertion of the plug on line 17 into the RJ11 jack 41 provides the physical and electrical connection of the SNID 19 to the telephone line. An end of the customer premises telephone wiring 21 terminates in an RJ11 plug (not separately shown). Insertion of the plug on the wiring 21 into the RJ11 jack 43 provides the physical and electrical connection of the SNID 19 to the customer premises wiring.

A two position switch 45 selectively connects the active pair of wires from the RJ11 jack 43 to either: (1) the active pair of wires of the RJ11 jack 41 or (2) a two-wire line port of a wireless-to-landline interface. The switch 45 will remain in each state or position until triggered to change to the other position. In the normal operating position (1), the switch 45 connects the active twisted wire pair of the customer premises wiring 21 from RJ11 jack 43 through to the active pair of wires of RJ11 jack 41, and through RJ11 jack 41, to the drop cable of the telephone line 17. In the alternative operating position (2), the switch 45 connects the active twisted wire pair of the customer premises wiring 21 from RJ11 jack 43 to the two-wire line port of the wireless-to-landline interface.

The wireless-to-landline interface provides two-way wireless communication, for wireline equipment connected thereto. In the presently preferred embodiment shown in FIG. 2, the wireless-to-landline interface comprises a landline-to-cellular interface 49 and a cellular transceiver 51. In the alternative operating position (2), the switch 45 connects the active twisted wire pair of the customer premises wiring 21 from RJ11 jack 43 to the two-wire line port of the landline-to-cellular interface 49.

The switch 45 changes between two latched states in response to one or more control signals from a controller 47. The switch changes from the normal line-connected state (1) to the second state (2) connecting the interface 49 in response to a control signal from the controller 47 triggered by a line fault detection, discussed more below. The controller 47 resets the switch 45 from the second state (2) to the normal line-connected state (1), in response to a manual reset input by a repair technician.

As noted, in the second position (2), the switch 45 disconnects the line 17 and connects the active twisted wire pair of the customer premises wiring 21 to the landline-to-cellular interface 49. The landline-to-cellular interface 49 in turn couples the customer premises wiring, connected through the RJ11 jack 43 and the switch 45, to the cellular transceiver 51. The landline-to-cellular interface 49 presents a two-wire telephone appearance to the switch 45 and through the switch and the RJ11 jack 43 to the customer premises wiring 21. Through this two-wire port connection, the interface 49 emulates a POTS type analog telephone loop from an end office type telephone switching system. The interface 49 provides line voltage, dial-tone, off-hook detection, digit collection and processing, ringing signal generation, etc., over the two-wire connection to the customer premises wiring 21. To customer premises telephone equipment 23 connected to the wiring 27, the connection through switch 45 to the interface 49 electrically appears virtually the same as the connection through the switch 45 to the drop cable of the telephone line 17.

The landline-to-cellular interface 49 provides all necessary protocol and/or signal format conversions between the signals on the two-wire line side and the signals going to and from the cellular transceiver 51. For example, assuming that the transceiver 51 is AMPS compliant, the interface 49 will detect dial pulse or DTMF digits representing a telephone number dialed in on one of the stations 23, recognize the end of digit input, and then supply the number as a digit string followed by a 'SEND' command over the appropriate input connection to the cellular transceiver 51. Such an input causes the transceiver to initiate an outgoing call through a base station transceiver 29, the MTSO 27 and one or more switches 11 of the PSTN. U.S. Pat. No. 4,658,096 to West, Jr. et al. discloses an early example of the landline-to-cellular interface 49.

The cellular transceiver 51 is a standard cellular transceiver unit, without the normally associated control head or handset. The interface 49 connects to the transceiver 51 in place of the control head or handset. The cellular transceiver 51 operates in compliance with the communication protocols used by the base station and MTSO of the cellular system serving the particular subscriber. For example, if the cellular system is an AMPS system, then the cellular transceiver 51 is an AMPS compliant transceiver. Those skilled in the art will recognize that a variety of other cellular or wireless telephone transceivers could be used.

When activate, the cellular transceiver 51 sends and receives voice frequency information modulated in the relevant cellular telephone RF frequency range via the antenna 25 and the cellular telephone network. The interface 49 and cellular transceiver 51 thus provide two-way telephone communications for customer premises telephone equipment coupled to wiring 21, as discussed in more detail below.

The controller 47 may take the form of a hard-wired logic circuit. Alternatively, the controller 47 may comprise a programmed microprocessor with associated read only memory (RAM) and random access memory (ROM).

The SNID 19 also includes a line fault detector 53, coupled to sense the condition of the telephone line 17 connected to the SNID 19 through the RJ11 jack 41. A variety of telephone line fault detector circuits are known (see e.g. above cited Dop et al. Patents). Typically, such a circuit senses the voltage and/or current on the line. For example, a loss of line voltage might indicate either a cut line 17 or a failure of the end office switching system 11. The line fault detector 53 provides a fault indication to the controller 47 to activate the switch 45, the interface 49 and the cellular transceiver 51.

The active elements of the SNID 19 normally receive power from a power supply circuit 55. In the illustrated embodiment, the power supply 55 draws power from the AC mains of the customer premises via an AC plug 57. Alternatively, the power supply 55 could include a trickle charge circuit and draw operating power from the telephone line 17.

In most installations of the SNID 19, it is important to provide reliable telephone service at all times. In this regard, the telephone services should not be susceptible to power system failures. Accordingly, the SNID 19 includes or connects to a back-up battery 59 which provides power to the active elements of the SNID when power supply 55 does not receive power from the AC mains via the plug 57, e.g. due to a power failure. When the power mains system is active, a battery charger 61 maintains the charge on the back-up battery 59.

Like a NID, the SNID 19 of the present invention serves as the demarcation point between the public network(s) and the customer premises wiring. The SNID 19 normally is installed in some location where it is relatively convenient for telephone company technicians to access the SNID. For example, in a single family home, the SNID 19 normally is installed on an exterior wall of the dwelling. The SNID 19 therefore includes a protective housing 63 enclosing all of the connections and electronic components of the SNID.

As noted above, the switch 45 normally connects the customer premises wiring 21 to the drop cable of the telephone line 17. Persons in the customer premises make and receive telephone calls, using the customer premises telephone equipment 23, via the line 17 and the end office switching system 11 in the normal manner. Assume now that a fault occurs, for example the drop cable portion of the line 17 is accidentally cut.

The fault detector 53 recognizes the loss of line voltage, caused for example by a cut line, as a line fault. In response, the detector 53 provides a fault indication signal to the controller 47. The controller activates the switch 45, the interface 49 and the cellular transceiver 51 in response to the line fault indication from detector 49. The switch 45 disconnects the customer premises wiring 21 from the RJ11 jack 41 and the line 17 and connects the customer premises wiring 21 to the twisted wire pair port of the landline-to-cellular interface 49. The interface 49 begins its operations, e.g. monitoring the customer premises wiring 21 for off-hook and dialing for an outgoing call.

At activation, the cellular transceiver 51 executes a normal routine to register as an active unit with the cellular system serving the transceiver's current location. Because the SNID 19 actually is a fixed position installation, the cellular transceiver 51 will execute its registration procedure through standard signaling communications with one local base station 29 and the MTSO 27. As noted above, the MTSO 27 considers the transceiver 49 as a valid cellular unit, albeit of a roaming subscriber.

As part of the roaming subscriber registration procedure, the MTSO 27 assigns one of its temporary directory numbers to the transceiver 51 in the SNID 19. The CPU of the MTSO 27 supplies a data message containing the assigned temporary directory number and an identification of the SNID 19 (e.g. by landline telephone number or by the transceiver identification) to the MSP 33. The MSP 33 identifies the loop 17 from the identification of the SNID contained in the message and compiles a call forwarding instruction in appropriate format for loading into the profile data associated with the loop 17 in the memory of the end office switching system 11. The MSP 33 forwards that instruction over an RC-MAC channel to the processor of the end office switch 11. In response, the processor of the switching system 11 activates call forwarding with respect to the loop 17 and loads the temporary number into the appropriate memory location.

Once activated and registered, the cellular transceiver 51 provides standard two-way cellular telephone call services through the cellular network, and the interface 49 and the switch 45 make those services available to persons at the premises 15 via the customer premises equipment 23. Persons at the customer premises 15 can make and receive calls from the equipment 23 in the normal manner, but such calls now go through the interface 49, the cellular transceiver 51 and the cellular network. The end office switch 11 forwards calls for the telephone number assigned to loop 17 via the cellular system using the assigned temporary directory number.

Consider first an outgoing call. When a user at the customer premises 15 wants to initiate a telephone call while the cellular transceiver 51 is active, the user takes a station 23 off-hook. The landline-to-cellular interface 49 connected to the customer premises wiring 21 through switch 45 and RJ11 jack 43 detects the off-hook and supplies dial tone. The user then dials in the telephone number digits in the normal manner. The landline-to-cellular interface 49 detects DTMF or dial pulse digits representing a telephone number, recognizes the end of digit input, and then supplies the number as a digit string followed by a 'SEND' command to the cellular transceiver 51. In response, the transceiver 51 initiates a call through the base station 29 and the MTSO 27. The telephone call goes through one or more switches of the PSTN, for example through end office switching system 11, to the destination station identified by the dialed digits, e.g. to telephone station 13 shown in FIG. 1. Once the connection is set-up, the cellular transceiver 51 communicates via wireless transmission and reception through antenna 25 with the transceiver in base station 29.

For example, voice frequency signals from the off-hook station 23 go through the wiring 21 and the interface 49 to the outgoing analog audio input of the transceiver 51. The transceiver 51 in turn modulates the outgoing voice frequency information using the assigned frequency and appropriate modulation techniques utilized on the particular cellular network and applies the modulated RF signal to the antenna 25. The antenna radiates the modulated signal for wireless transmission to the antenna associated with base station 29. That antenna supplies the relevant frequency channel to a transceiver in the base station 29 for demodulation. The demodulated signal is properly formatted and transmitted over a telephone line or trunk circuit to the MTSO 27. The MTSO routes the signal through the end office switching system 11 to the other party's telephone station 13, and the station 13 provides an audio output thereof to the other party.

In the opposite direction, when the called party speaks, the station 13 supplies the audio information through the telephone line to the end office switching system 11. The end office switching system 11 forwards the audio information to the MTSO 27, and the MTSO forwards that information over the line or trunk circuit to the transceiver in base station 29 that is serving the present call. The transceiver in base station 29 modulates and broadcasts the audio information using the appropriate modulation technique and the assigned frequency.

The antenna 25 receives the broadcast signal and supplies that signal to the cellular transceiver 51. The cellular transceiver 51 demodulates the received RF signal to recapture the voice frequency information from the assigned cellular channel. The transceiver 51 supplies the voice frequency information to the landline-to-cellular interface 49. The interface 49, in turn, supplies the incoming audio signal, at a level compatible with a standard telephone, through the switch 45 and the RJ11 jack 43 to the customer premises wiring 21. The off-hook station 23 connected to wiring 21 provides an audio output to the calling party at the premises 15, in the normal manner.

Consider now the processing of an incoming call. Assume for example, that a person at station 13 calls the customer premises 15 at some time after the line 17 was cut. The user takes the station 13 off-hook and dials the digits of the normal landline telephone number assigned to the line 17 and the customer premises 15. As part of its processing of the call to the number of line 17, the processor within the end office switching system 11 accesses the subscriber profile information associated with the telephone number assigned to the line 17. Under the present circumstances, the profile information will indicate that call forwarding is active and will identify the forwarding number, in this case the temporary directory number that the MTSO 27 assigned to the cellular transceiver 51.

Based on the subscriber profile information, the end office switching system 11 forwards the incoming call to the MTSO 27. As part of the forwarding, the end office switching system 11 indicates to the MTSO 27 that the call is for the temporary directory number, i.e. as currently assigned to the transceiver 51.

The cellular transceiver 51 processes cellular call related signaling messages exactly as does a standard cellular telephone. In the present example, the cellular transceiver 51 monitors paging or signaling messages on the cellular wireless communications and responds to an addressed paging signal from the MTSO 27 and base station 29 representing the presence of the incoming call. The cellular transceiver 51 interacts with the base station 29 and the MTSO 27 to receive the incoming call.

The cellular transceiver 51 will provide an appropriate signal indicating the presence of the incoming call to the landline-to-cellular interface 49. In response, the interface 49 applies a ringing voltage to the two-wire connection. The ringing voltage goes through the switch 45, the RJ11 jack 43 and the customer premises wiring 21 to the customer premises telephone equipment 23. In response, one or more telephones at the premises 15 ring.

When a person at the premises 15 answers the incoming call by lifting the handset of one of the stations 23, a ring-trip detector in the landline-to-cellular interface 49 senses this state transition and terminates the ringing voltage. The interface 49 signals the answer condition to the cellular transceiver 51 and provides a two-way voice grade analog circuit between the two-wire connection to the telephone station 23 and the voice frequency processing circuitry of the cellular transceiver 51. The cellular transceiver 51 then provides an answer message to the cellular network, and two-way voice communication commences on the assigned frequency channels in substantially the same manner discussed above relative to the outgoing call example.

At some later time, the telephone company will dispatch a repair crew to repair the cut drop cable portion of the telephone line 17. At that time, one of the repair technicians will open the housing 63 and manually activate a reset switch 65 connected to the controller 47. In response, the controller 47 deactivates the cellular transceiver 51 and the landline interface 49. The controller 47 also resets the switch 45 to the normal operating position (1). In that position, the switch 45 connects the customer premises wiring 21 through to the drop cable of the telephone line 17. At the time of the reset of the SNID 19, the technician will also communicate with the switching system 11, using normal maintenance procedures, to cancel call forwarding with respect to the telephone number assigned to the line 17 and the customer premises 15. Persons at the premises 15 can make and receive telephone calls via the line 17 in the normal manner.

When the controller 51 deactivates the cellular transceiver 51, the MTSO 27 recognizes that the transceiver is no longer active and lists the temporary directory number as available for reassignment.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A system providing primary and back-up communication capabilities to and from a customer premises, comprising:

a public switched network comprising a switching system and a communication line circuit running from the switching system to a point of demarcation on the customer premises;

a public wireless communication network comprising a mobile switching office in communication with the switching system and a wireless base station transceiver coupled to the mobile switching office;

a communication device at the customer premises;

customer premises wiring connected to the communication device and running to the point of demarcation; and a smart network interface device at the point of demarcation, wherein the smart network interface device comprises:

(a) a first coupling connected to the customer premises wiring;

(b) a second coupling connected to the communication line circuit;

(c) a wireless transceiver for two-way communication via the base station transceiver and the mobile switching office of the public wireless communication network;

(d) an interface, coupled to the wireless transceiver, providing signal or protocol conversions between signal formats or protocols used by the wireless transceiver and signal formats or protocols used on the line circuit;

(e) a selectively operative switch, connecting the first coupling to the second coupling in a first selective switch state and connecting the first coupling to the interface in a second selective switch state;

(f) a fault detector for monitoring status of the line circuit and providing an indication signal in response to detection of a fault; and (g) a controller, responsive to the indication signal, for activating the switch to transition to the second selective switch state and causing the wireless transceiver to register as active with the public wireless communication network;

wherein call forwarding is activated with respect to the communication line circuit of the public switched network in response to the registration of the wireless transceiver, such that a call intended for the communication line circuit will be forwarded through the public wireless communication network to the wireless transceiver.

2. A system as in claim 1, wherein the communication line circuit comprises a telephone line.

3. A system as in claim 2, wherein at least a portion of the telephone line comprises a twisted wire pair.

4. A system as in claim 2, wherein the customer premises wiring comprises a twisted wire pair.

5. A system as in claim 1, wherein the public switched network comprises a telephone network.

6. A system as in claim 1, wherein the public wireless communication network comprises a wireless telephone network.

7. A system as in claim 6, wherein the wireless telephone network comprises a cellular telephone network.

8. A system as in claim 7, wherein the wireless transceiver comprises a cellular telephone transceiver.

9. A system as in claim 8, wherein the interface comprises a landline-to-cellular interface.

10. A system providing primary and back-up communication capabilities to and from a customer premises, comprising:

a public switched network comprising a switching system and a communication line circuit running from the switching system to a point of demarcation on the customer premises;

a public wireless communication network comprising a mobile switching office in communication with the switching system and a wireless base station transceiver coupled to the mobile switching office;

a communication device at the customer premises;

customer premises wiring connected to the communication device and running to the point of demarcation; and a smart network interface device at the point of demarcation, wherein the smart network interface device comprises:

(a) a first coupling connected to the customer premises wiring;

(b) a second coupling connected to the communication line circuit;

(c) a wireless-to-landline interface providing a landline appearance port and two-way communication through the port via the public wireless communication network;

(d) a switch, selectively (1) connecting the first coupling to the second coupling and (2) connecting the first coupling to the port;

(e) a detector for sensing a fault on the communication line circuit; and (f) a controller, responsive to the sensing of a line fault, for activating the switch to connect the first coupling to the port and causing the wireless-to-landline interface to register as active with the public wireless communication network;

wherein call forwarding is activated with respect to the communication line circuit of the public switched network in response to the registration of the wireless-to-landline interface, such that a call intended for the communication line circuit will be forwarded through the public wireless communication network to the wireless-to-landline interface.

11. A system as in claim 10, wherein the wireless-to-landline interface comprises:

a wireless transceiver; and a landline interface, coupled to the wireless transceiver, providing signal or protocol conversions between signal formats or protocols used by the wireless transceiver and signal formats or protocols used on the customer premises wiring.

12. A method comprising:

detecting a fault in a wired line running from a public switched network to a customer premises;

in response to the fault detection, switching connection of customer premises communication line wiring from a connection to the line to a coupling to a wireless transceiver located at the customer premises;

registering the wireless transceiver with a public wireless communication network, wherein the registering includes assigning a temporary directory number of the public wireless communication network for use in routing incoming calls to the wireless transceiver;

in response to the registration with the public wireless telephone network, activating call forwarding in the public switched network and supplying the temporary directory number to the public switched network; and forwarding a call intended for the line through the public wireless network to the wireless transceiver using the temporary directory number.

13. A method as in claim 12, wherein the public switched network comprises a landline telephone network.

14. A method as in claim 12, wherein the public wireless network comprises a wireless telephone network.

15. A method as in claim 14, wherein the wireless telephone network comprises a cellular telephone network.

16. A method as in claim 12, wherein the wireless transceiver is an element of a network interface device, located at the customer premises and coupled between the customer premises wiring and the line.

17. A method comprising:

detecting a fault in a telephone line from a public switched telephone network;

in response to the fault detection, switching connection of customer premises telephone wiring from a connection to the line to a coupling to a wireless telephone transceiver located at the customer premises;

registering the wireless telephone transceiver with a public wireless telephone network;

in response to the registration with the public wireless telephone network, activating call forwarding in the public switched telephone network with regard to the line.

18. A method as in claim 17, wherein:

the step of registering the wireless telephone transceiver with a public wireless telephone network comprises assigning a temporary directory number to the wireless telephone transceiver; and the step of activating call forwarding comprises supplying the assigned temporary directory number to the public switched telephone network.

19. A method as in claim 18, further comprising:

detecting a call through the public switched telephone network intended for the line; and forwarding the call intended for the line through the public wireless telephone network to the wireless telephone transceiver using the assigned temporary directory number.

20. A method as in claim 17, wherein the wireless telephone network comprises a cellular telephone network.

21. A method as in claim 17, wherein the wireless telephone transceiver is an element of a network interface device, located at the customer premises and coupled between the customer premises telephone wiring and the line.

* * * * *